H. W. SCHOEN.
HORSESHOE CALK.
APPLICATION FILED MAR. 9, 1909.
927,884.
Patented July 13, 1909.
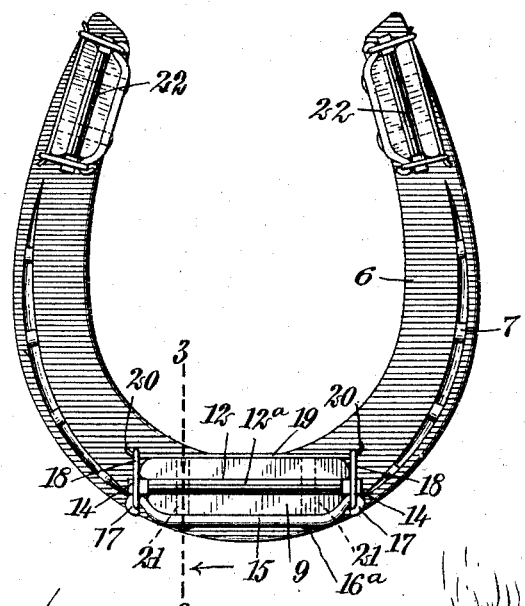
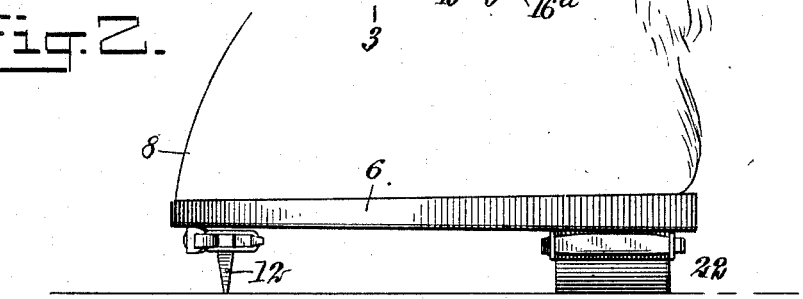
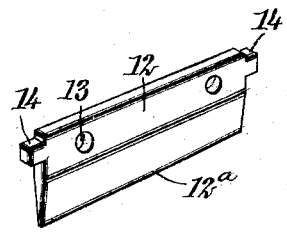
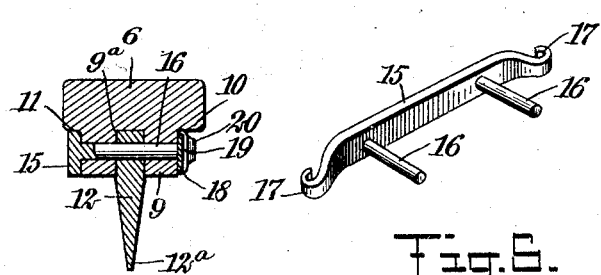
WITNESSES
INVENTOR
Harry W. Schoen
BY
ATTORNEYS

UNITED STATES PATENT OFFICE.

HARRY W. SCHOEN, OF SCRANTON, PENNSYLVANIA.

HORSESHOE-CALK.

No. 927,884.　　　　Specification of Letters Patent.　　　Patented July 13, 1909.

Application filed March 9, 1909.　Serial No. 482,337.

*To all whom it may concern:*

Be it known that I, HARRY W. SCHOEN, a citizen of the United States, and a resident of Scranton, in the county of Lackawanna and State of Pennsylvania, have invented a new and Improved Horseshoe-Calk, of which the following is a full, clear, and exact description.

My invention relates to horseshoe calks, my more particular purpose being to provide a horseshoe having its calks detachably secured in position so that they may be readily removed from or replaced upon the shoe.

Reference is to be had to the accompanying drawings forming a part of this specification, in which similar characters of reference indicate corresponding parts in all the figures.

Figure 1 is an inverted plan or bottom view of a horseshoe provided with my improved calks; Fig. 2 is a side elevation of the same; Fig. 3 is an enlarged section upon the line 3—3 of Fig. 1, looking in the direction of the arrow, and showing how the calks are secured in position; Fig. 4 is a detail showing in perspective one of the improved calks removed from the shoe; and Fig. 5 is a perspective of a yoke and pins carried by it for the purpose of detachably holding the calk in position.

A horseshoe is shown at 6 and is secured by nails 7 upon the hoof 8 in the usual or any desired manner. The horseshoe 6 is provided with a thickened portion 9 having a slot 9ª, and is also provided with shoulders 10, 11 which bound this thickened portion.

At 12 is a calk having generally the form of a wedge and provided with a cutting edge 12ª for the purpose of digging into the soil and thereby affording the horse a sure foothold. The calk 12 is provided with holes 13 and at its ends is further provided with projecting portions 14.

At 15 is a yoke and connected with it are bolts 16. The yoke 15 is at its ends provided with ears 17, links 18 being adapted to engage these ears, as will be understood from Fig. 1. A spring plate 19 is provided with upturned ends 20 which are adapted to engage the links 18. The thickened portion 9 of the horseshoe is provided with holes 21 extending through it in the general direction of its width for accommodating the bolts 16, as will be understood from Fig. 1.

In assembling the parts, the calks 12 are inserted in position, as indicated in Fig. 3. The bolts 16 are next extended horizontally through the thickened portion 9, so that the yoke 15 lodges against the edge of this thickened portion. The links 18 being journaled upon the ears 17 are free to swing and are of proper size to engage the projecting portions 14 of the calk. The links being swung around parallel with each other, the spring plate 19 is next placed in position, its upturned ends 20 being passed through the links as indicated in Fig. 1. The action of the spring plate 19 is to pull upon the ends of the links 18 and thus bind the yoke tightly against the adjoining edge of the thickened portion 9. The calk 12 is now held in position in two ways: first, by the bolts 16 which extend directly through the holes 13, and second, by the projecting portions 14 at the ends of the calk, these projecting portions extending into the links 18.

The calks 22, 22 and their mountings, being in every way similar to the calk 12 and its mountings, I do not deem it necessary to describe them further.

Having thus described my invention, I claim as new and desire to secure by Letters Patent:

1. The combination of a horseshoe provided with a thickened portion having an opening, a calk provided with a surface for engaging the ground and with a portion for fitting into said opening, bolts extending through said thickened portion and through said calk, and a yoke detachably connected with said thickened portion for holding said bolts in position.

2. The combination of a horseshoe provided with a thickened portion, a calk provided with a portion extending into said thickened portion, a yoke engaging said thickened portion and provided with bolts extending through the same and through said calk, a spring plate for holding said yoke in position, and a connection from said yoke to said spring plate.

3. The combination of a horseshoe provided with a thickened portion, links journaled adjacent to said thickened portion and adapted to swing, a calk provided with projecting portions for fitting into said links, and means for normally holding said links in predetermined positions relatively to each other and to said horseshoe.

4. The combination of a horseshoe provided with a thickened portion having a slot, a calk extending into said slot and provided with a surface for engaging the ground, a yoke for engaging said thickened portion, bolts carried by said yoke and extending through said thickened portion and through said calk, links journaled upon the ends of said yoke and adapted to swing relatively to each other, and a spring plate engaging said thickened portion and provided with upturned ends for engaging with said links.

5. The combination of a horseshoe provided with a thickened portion having a slot, a calk provided with a portion extending into said slot, a bolt extending through said thickened portion and through said calk, and a yoke for securing said bolt in position relatively to said thickened portion and said calk, and means for detachably securing said yoke to said thickened portion.

6. The combination of a horseshoe provided with a thickened portion having a slot, a calk provided with a portion for extending into said slot, bolts for extending through said thickened portion and through said calk, and a yoke for detachably engaging said thickened portion and said bolts in order to hold said bolts in position relative to said thickened portion, and means for holding said yoke upon said thickened portion.

In testimony whereof I have signed my name to this specification in the presence of two subscribing witnesses.

HARRY W. SCHOEN.

Witnesses:
 HARRY JONES, Jr.,
 EDGAR A. JONES.